United States Patent [19]

Spivack et al.

[11] 3,935,164

[45] Jan. 27, 1976

[54] LIGHT STABILIZED POLYMER COMPOSITIONS

[75] Inventors: John d. Spivack, Spring Valley; Peter P. Klemchuk, Yorktown Heights, both of N.Y.

[73] Assignee: Ciba-Geigy Corporation, Ardsley, N.Y.

[22] Filed: May 28, 1974

[21] Appl. No.: 473,633

Related U.S. Application Data

[63] Continuation of Ser. No. 339,458, March 8, 1973, abandoned.

[52] U.S. Cl. .............. 260/45.75 N; 260/45.8 N; 260/45.85 B; 260/45.85 P; 260/45.95 F
[51] Int. Cl.² ........................................ C08G 6/00
[58] Field of Search . 260/47.75 N, 45.8 N, 45.95 F, 260/45.85 B, 45.85 P

[56] References Cited
UNITED STATES PATENTS

| | | | |
|---|---|---|---|
| 3,206,431 | 9/1965 | Doyle et al. | 260/45.85 |
| 3,464,943 | 9/1969 | Newland et al. | 260/45.8 |
| 3,464,953 | 9/1969 | Newland | 260/45.75 |
| 3,481,897 | 12/1969 | Marinaccio et al. | 260/45.75 |
| 3,607,828 | 9/1971 | Hussey | 260/45.75 |
| 3,642,690 | 2/1972 | Mills | 260/45.75 |
| 3,786,021 | 1/1974 | Mathis et al. | 260/45.75 |
| 3,838,099 | 9/1974 | Mathis | 260/45.75 |
| 3,843,595 | 10/1974 | Mathis et al. | 260/45.75 |

*Primary Examiner*—V. P. Hoke
*Attorney, Agent, or Firm*—Charles W. Vanecek

[57] ABSTRACT

Organic polymeric materials normally subject to oxidative and ultraviolet light deterioration are stabilized by incorporating therein a nickel 3,5-bis-dialkyl-4-hydroxybenzoate, an ultraviolet light absorber such as benzophenone or a benzotriazole, and optionally a primary phenolic antioxidant with or without a secondary sulfur containing antioxidant.

14 Claims, No Drawings

LIGHT STABILIZED POLYMER COMPOSITIONS

DETAILED DESCRIPTION

This is a continuation of application Ser. No. 339,458, filed on Mar. 8, 1973, now abandoned.

This invention relates to the stabilization of organic materials normally subject to deterioration by exposure to heat and light by incorporating therein a combination of additives comprising a nickel salt of 3,5-dialkyl-4-hydroxybenzoic acid, an ultraviolet light absorber, and optionally, a primary phenolic antioxidant with or without a secondary sulfur containing antioxidant.

The stabilization system of the present invention is useful for stabilizing organic materials normally subject to oxidative, thermal and ultraviolet light deterioration. Materials which are thus stabilized include synthetic organic polymeric substances such as styrene, including homopolystyrene and copolymers with acrylonitrile and/or butadiene; vinyl resins formed from the polymerization of vinyl halides or from copolymerization of vinyl halides with unsaturated polymerizable compounds, for example, vinyl esters, α,β-unsaturated acids, α,β-unsaturated esters, and unsaturated hydrocarbons such as butadienes and styrene; poly-α-olefins such as high, medium and low density polyethylene, cross-linked polyethylene, polypropylene, poly(4-methylpentene-1), polybutene-1, and the like including copolymers of poly-α-olefins such as ethylene-propylene, ethylene-butylene copolymers, and the like; polybutadiene; polyisoprene; polyurethanes such as are prepared from polyols such as propylene glycol and ethylene glycol and organic polyisocyanate; polyamides such as polyhexamethylene adipamide and polycaprolactam; polyesters such as polymethyleneterephthalate and polyethyleneterephthalate; polycarbonates such as those prepared from bisphenol-A and phosgene; polyacetals; polyethylene oxide and polypropylene glycol; and polyacrylics such as polyacrylonitrile and polymethylmethacrylate; polyphenyleneoxides such as those prepared from 2,6-dimethylphenol and the like. Particularly preferred polymers for the compositions of this invention are those normally solid polymers of alpha-olefins having up to 3 carbon atoms, e.g., ethylene, propylene and their copolymers.

The nickel derivatives of 3,5-dialkyl-4-hydroxybenzoic acid of this invention are represented by the formula

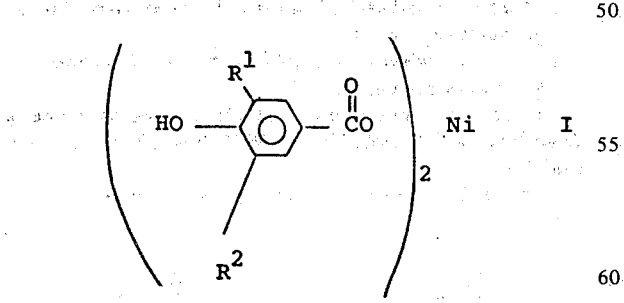

wherein
$R^1$ and $R^2$ are the same or different and each is a (lower)alkyl group containing from 1 to 8 carbon atoms.

Illustrative of the (lower)alkyl groups as represented by $R^1$ and $R^2$ include methyl, ethyl, propyl, isopropyl, butyl, t-butyl, pentyl, hexyl and octyl. The most preferred groups are methyl and t-butyl.

The nickel salts are prepared according to procedures described in U.S. Pat. No. 3,189,630.

The nickel compounds of formula I are added to the polymer substrate in an amount of from about 0.001% to about 15% by weight based on the weight of the polymer and preferably from 0.05 to 2%.

The ultraviolet light absorbers that are employed in this invention are (a) benzophenones and (b) benzotriazoles.

a. The benzophenones have the general formula

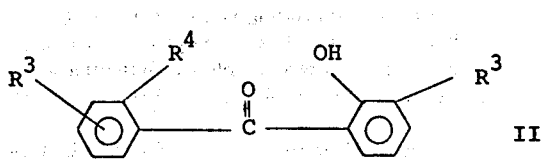

wherein
$R^3$ is hydrogen, hydroxy group, halogen, lower alkyl group or alkoxy group having from 1 to 12 carbon atoms, and
$R^4$ is hydrogen, hydroxy or alkyl from 1 to 12 carbon atoms.

In a preferred embodiment, $R^3$ is hydrogen and $R^4$ is a straight chain alkyl group having from 8 to 12 carbon atoms. Illustrative examples of the above described benzophenones are listed below.

2-hydroxy-4-methoxybenzophenone
2,2'-dihydroxy-4-methoxybenzophenone
2-hydroxy-4-methoxy-2'-carboxybenzophenone
2,2'-dihydroxy-4-n-octoxybenzophenone
2-hydroxy-4-n-octoxybenzophenone
5-chloro-2-hydroxybenzophenone
2,4-dihydroxybenzophenone
4-dodecyloxy-2-hydroxyphenone
2-hydroxy-4-decyloxylbenzophenone
2,2'-dihydroxy-4,4'-dimethoxybenzophenone
2,2',4,4'-tetrahydroxybenzophenone b. The benzotriazoles have the general formula

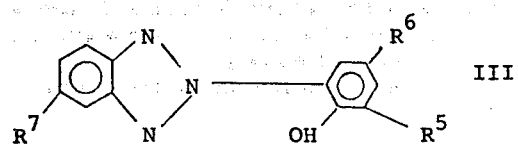

wherein
$R^5$ is hydrogen, or lower alkyl containing from 1 to 6 carbon atoms,
$R^6$ is hydrogen, alkyl containing 1 to 12 carbon atoms, phenyl or benzyl, and
$R^7$ is hydrogen, chlorine or (lower) alkyl containing from 1 to 6 carbon atoms.

In a preferred embodiment, $R^7$ is hydrogen, chlorine or a methyl group; $R^5$ is hydrogen, chlorine t-butyl, t-amyl; and $R^6$ is alkyl from 1 to 12 carbon atoms such as methyl, ethyl, hexyl, octyl, dodecyl, t-butyl, t-amyl, isopropyl and the like. Illustrative examples of benzotriazoles employed in this invention are listed below.

2-(2'-hydroxy-5'-methylphenyl)-benzotriazole
2-(2'-hydroxy-5'-tert.butylphenyl)5-chlorobenzo-
  triazole
2-(2'-hydroxy-5'-amylphenyl)-benzotriazole
2-(2'-hydroxy-3',5'-dimethyl-phenyl)-benzotriazole
2-(2'-hydroxy-3',5'-dimethyl-phenyl)-5-methox-
  ybenzotriazole
2-(2'-hydroxy-3',5'-dimethyl-phenyl)-5-methylben-
  zotriazole
2-(2'-hydroxy-5'-tert-octylphenyl)benzotriazole
2-(2'-hydroxy-5'-methylphenyl)-benzotriazole
2-(2'-hydroxy-5'-tert.butyl-phenyl-5-chlorobenzo-
  triazole
2-(2'-hydroxy-5'-amylphenyl)benzotriazole
2-(2'-hydroxy-5'-tert.butylphenyl)benzotriazole
2-(2'-hydroxy-5'-methoxy-phenyl)benzotriazole
2-(2'-hydroxy-5'-methyl-phenyl)-5,6-dichlorobenzo-
  triazole
2-(2'-hydroxy-5'-phenyl-phenyl)-5-chlorobenzo-
  triazole
2-(2'-hydroxy-3',5'-dichlorophenyl)-benzotriazole
2-(2'-hydroxy-4',5'-dichlorophenyl)-benzotriazole
2-(2'-hydroxy-5'-phenyl-phenyl)-benzotriazole
2-(2'-hydroxy-5'-methoxy-phenyl)-5-methylbenzo-
  triazole The ultraviolet light absorbers of Formulas II and III are added to the polymer substrate in an amount of from about 0.01 to about 5% by weight based on the weight of the polymer and more preferably from 0.05 to 2%.

In addition to the actinic stabilizers described, the plastic compositions may contain other additives such as plasticizers, pigments, fillers, dyes, glass or other fibers, phosphites, thermal antioxidants, and the like. For example, in most applications, it is desirable to incorporate into the resin composition, sufficient thermal antioxidants to protect the plastic against thermal and oxidative degradation. Thus, the amount of antioxidant in the compositions of the instant invention may range from 0 to about 5% by weight based on the weight of the polymer and when used preferably from 0.01 to 2% by weight.

The best results are obtained with the preferred class of thermal antioxidants, normally hindered phenols. These compounds are considered primary antioxidants and have been found to provide the best thermal stabilization with the least discoloration in the compositions of the invention. Examples of these phenolic antioxidants include the following:

1. Phenolic compounds having the formula:

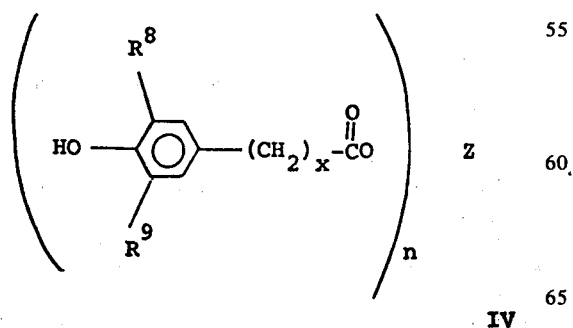

IV wherein
  $R^8$ and $R^9$ are the same or different and each is a (lower)alkyl group containing from 1 to 6 carbon atoms,
  $x$ is an integer of from 1 to 4,
  $n$ is an integer of from 1 to 4, and
  Z is an aliphatic hydrocarbon of the formula $C_yH_{2y+2-n}$
in which $y$ has a value of from 2 to 18 when $n$ is 1 or 2 and a value of from 3 to 6 when $n$ is greater than 2.

Illustrative examples of such compounds are
n-octadecyl-3-(3,5-di-t-butyl-4-hydroxyphenyl)-pro-
  pionate
n-octadecyl-2-(3,5-di-t-butyl-4-hydroxyphenyl)-ace-
  tate
n-octadecyl-4-(3,5-di-t-butyl-4-hydroxyphenyl)buty-
  rate
n-hexyl-3,5-di-t-butyl-4-hydroxyphenylpropionate
n-dodecyl-3,5-di-t-butyl-4-hydroxyphenylpropionate
neo-dodecyl-3-(3,5-di-t-butyl-4-hydroxyphenyl)-
  propionate
dodecyl-β-(3,5-di-t-butyl-4-hydroxyphenyl)-pro-
  pionate
ethyl-α-(4-hydroxy-3,5-di-t-butylphenyl)-isobutyrate
octadecyl-α-(4-hydroxy-3,5-di-t-butylphenyl)-isobu-
  tyrate
octadecyl-α-(4-hydroxy-3,5-di-t-butylphenyl)pro-
  pionate
1,2-propylene glycol bis-{3-(3,5-di-t-butyl-4-hydrox-
  yphenyl)propionate}
ethylene glycol bis-{3-(3,5-di-t-butyl-4-hydroxy-
  phenyl)propionate}
neopentylglycol bis-{3-(3,5-di-t-butyl-4-hydroxy-
  phenyl)propionate}
ethylene glycol bis-(3,5-di-t-butyl-4-hydroxypheny-
  lacetate)
glycerine-1-n-octadecanoate-2,3-bis-(3,5-di-t-butyl-
  4-hydroxyphenylacetate
pentaethylthritol-tetrakis-{3-(3',5'-di-t-butyl-4'-
  hydroxyphenyl)propionate}
1,1,1-trimethylol ethane-tris-3-(3,5-di-t-butyl-4-
  hydroxyphenyl)propionate
sorbitol {hexa- 3-(3,5-di-t-butyl-4-hydroxyphenyl)-
  propionate}
1,2,3-butanetriol tris-{3-(3,5-di-t-butyl-4-hydroxy-
  phenyl)propionate}
2-hydroxyethyl-7-(3-methyl-5-t-butyl-4-hydroxy-
  phenyl)heptanoate
2-stearoyloxyethyl-7-(3-methyl-5-t-butyl-4-hydroxy-
  phenyl)heptanoate
1,6-n-hexanediol-bis{(3',5'-di-t-butyl-4-hydroxy-
  phenyl)propionate}.

The above phenolic ester stabilizers are more fully described in U.S. Pat. No. 3,330,859 and U.S. Pat. No. 3,644,482.

2. Phenolic compounds having the formula

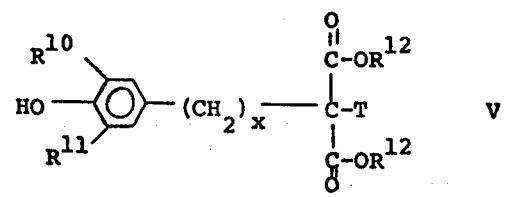

V wherein
T is hydrogen or

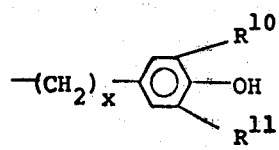

R$^{10}$ and R$^{11}$ are the same or different and each is a (lower)alkyl group containing from 1 to 6 carbon atoms, R$^{12}$ is an alkyl group containing from 1 to 18 carbon atoms, and x is an integer of from 1 to 4.

Illustrative examples of the compounds shown above are
di-n-octadecyl-α-(3,5-di-t-butyl-4-hydroxybenzyl)-malonate
di-n-octadecyl-α-(3-t-butyl-4-hydroxy-5-methyl-benzyl)malonate which is disclosed in the Netherlands Pat. No. 6,711,199, Feb. 19, 1968
di-n-octadecyl-,α'-bis-(3-t-butyl-4-hydroxy-5-methylbenzyl)malonate which is disclosed in the Netherlands Pat. No. 6,803,498, Sept. 19, 1968, 3. Phenolic compounds having the formula

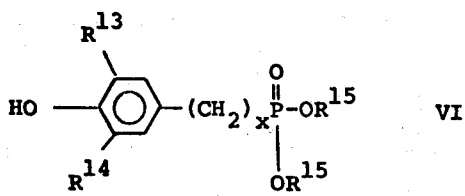

wherein
R$^{13}$ and R$^{14}$ are the same or different and each is a (lower)alkyl group containing from 1 to 6 carbon atoms,
x is an integer of from 1 to 4, and
R$^{15}$ is an alkyl group containing from 6 to 18 carbon atoms.

Illustrative examples of such compounds are
di-n-octadecyl-3,5-di-t-butyl-4-hydroxybenzylphosphonate
di-n-octadecyl-1-(3,5-di-t-butyl-4-hydroxyphenyl)-ethanephosphonate
di-n-tetradecyl-3,5-di-t-butyl-4-hydroxybenzylphosphonate
di-n-hexadecyl-3,5-di-t-butyl-4-hydroxybenzylphosphonate
di-n-dodecyl-3,5-di-t-butyl-4-hydroxybenzylphosphonate The above di-(higher)alkyl phenolic phosphonates are more fully described in U.S. Pat. No. 3,281,505.

4. Phenolic compounds having the formula

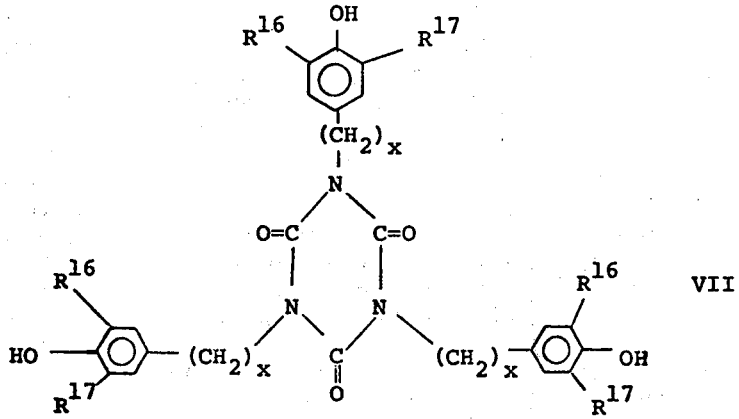

wherein
R$^{16}$ and R$^{17}$ are the same or different and each is a lower alkyl group containing from 1 to 6 carbon atoms, and
x is an integer of from 1 to 4.

Illustrative examples of such compounds are
tris-(3,5-di-t-butyl-4-hydroxybenzyl)isocyanurate
tris-(3-t-butyl-4-hydroxy-5-methylbenzyl)isocyanurate.

The above hydroxyphenylalkenyl isocyanurates are more fully described in U.S. Pat. No. 3,531,483.

The above phenolic hydrocarbon stabilizers are known and many are commercially available.

In addition to the above mentioned additives the present invention also covers the use of a secondary antioxidant which may optionally be employed with the primary phenolic antioxidant. Illustrative examples of such secondary antioxidants are the organosulfur compounds distearylthiodipropionate and dilaurylthiodipropionate. The secondary antioxidants may be used in an amount ranging from 0 to about 5% by weight based on the weight of polymer and when used preferably from 0.01 to 2% by weight.

The stabilized polymers of the present invention have utility in the normal use for which plastics are employed and are particularly useful for film and fiber. Compounds of this invention may be incorporated in the polymeric substance during the usual processing operations for example, by hot milling, the composition then being extruded, pressed, blow molded or the like into films, fibers, filaments, hollow spheres and the like. Where the polymer is prepared from a liquid monomer as in the case of styrene, the stabilizer may be dispersed or dissolved in the monomer prior to polymerization or curing.

The following examples, presented for illustration and not limitation, will further serve to typify the nature of the present invention.

EXAMPLE 1

Artificial Light Exposure Test

Deterioration of most polymers caused by ultraviolet light is slow at ambient conditions and therefore, testing of the effects of stabilizers generally is conducted in an accelerated artificial light exposure device in order to yield results in a convenient period of time. The test conducted on polymers using an artificial light exposure device is described below:

a. Sample Preparation 5 mil Film — The additives are dissolved in distilled methylene chloride and blended with unstabilized polypropylene powder (Hercules Profax 6501) in a Hobart mixer. The blended material is then milled on a two roll mill for 5 minutes at 182°C. The milled sheet is then compression molded at 220°C into 5 mil thick film under a pressure of 350 psi and water cooled in the press.

b. Testing Method

This test is conducted in a FS/BL unit, basically of the American Cyanamid design which consists of 40 tubes of alternating fluorescent sun lamps and black lights (20 of each). The 5 mil sample films are mounted on 3 × 2 inch infrared card holders with ¼ × 1 inch windows and are placed on a rotating drum 2 inches from the bulbs in the FS/BL unit. The time in hours is noted for the development of 0.5 carbonyl absorbance units at 5.85 nanometers as determined on an Infrared Spectophotometer. The development of carbonyl functional groups in the polymer is proportional to the amount of degradation caused by the ultraviolet light exposure.

The test results reported below were obtained according to the procedures described above. The amounts of the additives are expressed in weight percent based on the weight of the polymer.

TABLE I

| Composition | Time in Hours to 0.5 Carbonyl Absorbance Units |
|---|---|
| 0.5% nickel-bis-3,5-di-tert-butyl-4-hydroxybenzoate 0.25% 2-hydroxy-4-n-octoxybenzo-phenone | 3825 |
| 0.5% nickel-bis-3,5-di-tert-butyl-4-hydroxybenzoate 0.25% 2-(2'-hydroxy-3',5'-di-tert-butylphenyl)-5-chlorobenzotriazole | 3824 |
| 0.5% nickel-bis-3,5-di-tert-butyl-4-hydroxybenzoate 0.25% 2-(2'-hydroxy-3',5'-di-tert-amylphenyl)benzotriazole | 3850 |
| 0.25% nickel-bis-3,5-di-tert-butyl-4-hydroxybenzoate 0.1% octadecyl-3-(3',5'-di-tert-butyl-4'-hydroxyphenyl)propionate 0.25% 2-(3'-tert-butyl-2'-hydroxy-5'-methylphenyl)-5-chlorobenzotriazole | 2710 |
| 0.25% nickel-bis-3,5-di-tert-butyl-4-hydroxybenzene 0.1% octadecyl-3-(3',5'-di-tert-butyl-4'-hydroxyphenyl)propionate 0.25% 2-(2'-hydroxy-3',5'-di-tert-butyl-phenyl)-5-chlorobenzotriazole 0.25% nickel-bis-3,5-di-tert-butyl-4-hydroxybenzoate | 2430 |

TABLE I-continued

| Composition | Time in Hours to 0.5 Carbonyl Absorbance Units |
|---|---|
| 0.1% octadecyl-3-(3',5'-di-tert-butyl-4'-hydroxyphenyl)propionate 0.25% 2-(2'-hydroxy-3',5'-di-tert-amyl-phenyl)benzotriazole | 2400 |
| 0.25% nickel-bis-3,5-di-tert-butyl-4-hydroxybenzoate 0.1% octadecyl-3-(3',5'-di-tert-butyl-4'-hydroxyphenyl)propionate 0.25% 2-hydroxy-4-n-octoxybenzophenone | 3210 |
| 0.25% nickel-bis-3,5-di-tert-butyl-4-hydroxybenzoate 0.25% 2-(2'-hydroxy-3',5'-di-tert-amyl-phenyl)benzotriazole 0.1% tetrakis-{methylene-3-(3',5'-di-tert-butyl-4'-hydroxyphenyl)propionate}methane | 2130 |
| 0.25% nickel-bis-3,5-di-tert-butyl-4-hydroxybenzoate 0.25% 2-(2'-hydroxy-3',5'-di-tert-amyl-phenyl)benzotriazole 0.25% O,O-di-octadecyl-3,5-di-tert-butyl-4-hydroxylbenzyl phosphonate | 3156 |
| 0.25% nickel-bis-3,5-di-tert-butyl-4-hydroxybenzoate 0.25% 2-(2'-hydroxy-3',5'-di-tert-amyl-phenyl)benzotriazole 0.1% 1,3,5-tris(3,5-di-tert-butyl-4-hydroxybenzyl)-s-triazine-2,4,6-(1H, 3H, 5H)-trione | 2130 |
| 0.25% nickel-bis-3,5-di-tert-butyl-4-hydroxybenzoate 0.25% 2-(2'-hydroxy-3',5'-di-tert-amyl-phenyl)benzotriazole 0.1% di-octadecyl-2-(3-tert-butyl-5-methyl-4-hydroxybenzyl)malonate | 2304 |
| 0.1% octadecyl-3-(3',5'-di-tert-butyl-4'-hydroxyphenyl)propionate 0.3% distearylthiodipropionate (DSTDP) 0.25% nickel-bis-3,5-di-tert-butyl-4-hydroxybenzoate 0.25% 2-(2'-hydroxy-3',5'-di-tert-amyl-phenyl)benzotriazole | 2620 |
| No stabilizers | 168 |
| 0.5% nickel-bis-3,5-di-tert-butyl-4-hydroxybenzoate | 1970 |

Other hindered phenolic antioxidants may be used in place of octadecyl-4-(3,5-di-t-butyl-4-hydroxyphenyl)-propionate in the above mentioned compositions utilizing a hindered phenolic, for example, di-n-octadecyl α(3-t-butyl-4-hydroxy-5-methylbenzyl)malonate, dioctadecyl 3-(3',5'-di-t-butyl-4'-hydroxybenzyl)phosphonate, pentaethylthritoltetrakis-{3-(3,5-di-t-butyl-4-hydroxyphenyl)propionate} and tris-(3,5-di-t-butyl-4-hydroxybenzyl)isocyanurate, respectively.

EXAMPLE 2 a. A composition comprising acrylonitrilebutadienestyrene terpolymer and 0.5% of nickel bis-3,5-di-tert-butyl-4-hydroxybenzoate, 0.25% of 2-(2'-hydroxy-3',-5'-di-tertbutylphenyl)-5-chlorobenzotriazole and 0.1% of tetrakis{methylene-3-(3',5'-di-tert-butyl-4'-hydroxyphenyl)propionate}methane resists embrittlement due to exposure to ultraviolet light longer than one which does not contain the stabilizer.

b. A composition comprising a polyurethane prepared from toluene diisocyanate and alkylene polyols (such as polyethylene glycol and polypropylene glycol) and 0.25% by weight of nickel bis-3,5-di-tert-butyl-4-hydroxybenzoate, 0.1% of octadecyl 3-(3',5'-di-tert-butyl-4'-hydroxyphenyl)propionate and 0.25% of 2-hydroxy-4-n-octoxybenzophenone is more stable to sunlight, fluorescent sunlamps, black lights and fluorescent lights than the unformulated polyurethane.

c. A composition comprising a polycarbonate prepared from bisphenol-A and phosgene and 0.25% by weight of nickel bis-3,5-di-tert-butyl-4-hydroxybenzoate, 0.1% of octadecyl 3-(3',5'-di-tert-butyl-4'-hydroxyphenyl)propionate and 0.25% of 2-(2'-hydroxy-3',5'-di-tertamylphenyl)benzotriazole resists discoloration due to exposure to ultraviolet light longer than one which does not contain the stabilizer.

d. A composition comprising a polyester (polyethyleneterephthalate) and 0.25% by weight of nickel bis-3,5-di-tert-butyl-4-hydroxybenzoate, 0.1% of octadecyl 3-(3',5'-di-tert-butyl-4'-hydroxyphenyl)propionate and 0.25% of 2-(2'-hydroxy-3',5'di-tert-butylphenyl)-5-chlorobenzotriazole resists discoloration due to exposure to ultraviolet light longer than one which does not contain the stabilizer.

e. A composition comprising polymethylmethacrylate and 0.25% by weight of nickel-bis-3,5-di-tert-butyl-4-hydroxybenzoate, 0.1% of octadecyl-3-(3',5'-di-tert-butyl-4'-hydroxyphenyl)propionate and 0.25% of 2-(3'-tert-butyl-2'-hydroxy-5'-methylphenyl)-5-chlorobenzotriazole resists discoloration due to exposure to ultraviolet light longer than one which does not contain the stabilizer.

EXAMPLE 3 a. A stabilized linear polyethylene is prepared by incorporating therein 0.1% by weight of octadecyl-3-(3',5'-di-tert-butyl-4'-hydroxyphenyl)propionate, 0.3% of distearylthiodipropionate, 0.25% of nickel bis-3,5-di-tert-butyl-4-hydroxybenzoate, and 0.25% 2-(2'-hydroxy-3',5'-di-tert-amylphenyl)benzotriazole. The stabilized compositions resist embrittlement due to exposure to ultraviolet light longer than one which does not contain the stabilizer.

b. A stabilized polyamide (nylon 6,6) is prepared by incorporating therein 0.25% by weight of nickel-bis-3,5-di-tert-butyl-4-hydroxybenzoate, 0.25% of 2-(2'-hydroxy-3',5'-di-tert-amylphenyl)benzotriazole and 0.1% of di-octadecyl-2-(3-tert-butyl-5-methyl-4-hydroxybenzyl)malonate. The light stability of the stabilized composition is superior to that of an unstabilized polyamide.

c. A stabilized polyphenylene oxide polymer (prepared by polymerizing 2,6-dimethylphenol) is prepared by incorporating therein 0.25% by weight of nickel-bis-3,5-di-tert-butyl-4-hydroxybenzoate, 0.25% of 2-(2'-hydroxy-3',5'-di-tertamylphenyl)benzotriazole and 0.1% of tris-(3,5-di-tert-butyl-4-hydroxybenzyl)isocyanurate. The stabilized compositions resist embrittlement due to exposure to ultraviolet light longer than one which does not contain the stabilizer.

d. A stabilized crystalline polystyrene is prepared by incorporating therein 0.25% by weight of nickel-bis-3,5-di-tert-butyl-4-hydroxybenzoate, 0.25% of 2-(2'-hydroxy-3',5'-di-tert-amylphenyl)benzotriazole and 0.1% of 0,0'-di-octadecyl-3,5-di-tert-butyl-4-hydroxybenzyl phosphonate. The stabilized compositions resist embrittlement due to exposure to ultraviolet light longer than one which does not contain the stabilizer.

EXAMPLE 4

High impact polystyrene resin containing elastomer (i.e., butadiene-styrene) is stabilized against loss of elongation properties due to exposure to ultraviolet light by incorporation of 0.5% by weight of nickel bis-3,5-di-tert-butyl-4-hydroxybenzoate, and 0.25% of 2-hydroxy-4-n-octoxybenzophenone.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163°C and a pressure of 2000 pounds per square inch into a sheet of uniform thickness (25 mil). The sheets are then cut into strips approximately 4 × 0.5 inches. A portion of these strips is then measured for percent of elongation in the Instron Tensile Testing Apparatus (Instron Engineering Corporation, Quincy, Massachusetts). The remaining portion of the strips are placed in an FS/BL chamber according to Example 3 (b) except that the time to 50% reduction in elongation is measured. The stabilized polystyrene resin retains its elongation property longer than the unstabilized resin.

Similar results are obtained when the following stabilizer compositions are used in place of the above mentioned stabilizer composition a. 0.5% nickel bis-3,5-di-tert-butyl-4-hydroxybenzoate
   0.25% 2-(2'-hydroxy-3',5'-di-tert-amylphenyl)-benzotriazole b. 0.5% nickel bis-3,5-di-tert-butyl-4-hydroxybenzoate
   0.25% 2-(2'-hydroxy-3',5'-di-tert-butylphenyl)-5-chlorobenzotriazole Antioxidants may also be incorporated in an amount of 0.1% by weight into each of the above mentioned compositions for example, di-n-octadecyl-α,α'-bis(3-t-butyl-4-hydroxy-5-methylbenzyl)malonate, pentaerythritol-tetrakis-{3-(3,5-di-t-butyl-4-hydroxyphenyl)-propionate}, tris-(3,5-di-t-butyl-4-hydroxybenzyl)isocyanurate, di-n-octadecyl-3,5-di-butyl-4-hydroxybenzyl phosphonates and n-octadecyl-3)3',5'-di-t-butyl-4-hydroxyphenyl)propionate respectively. Together with these antioxidants, the secondary antioxidant, dilaurylthiodipropionate, may also be used in an amount of 0.3% by weight based on the weight of the polymer.

What is claimed is:

1. A composition of matter stabilized against oxidative and ultraviolet light deterioration which comprises
   a. a synthetic organic polymer normally subject to ultraviolet and oxidative deterioration,
   b. from 0.001 to 5% by weight based on the weight of polymer of a nickel 3,5-di-t-alkyl-4-hydroxybenzoate having up to 8 carbon atoms in the t-alkyl group,
   c. from 0.001 to 5% by weight based on the weight of polymer of an ultraviolet light absorber selected from (1) 2-hydroxy-4-n-octoxybenzophenone, or (2) a benzotriazole selected from 2-(2'-hydroxy-3',5'-di-t-butylphenyl)-5-chlorobenzotriazole, 2-(2'-hydroxy-3,5-di-t-amylphenyl) benzotriazole or 2-(3'-t-butyl-2'-hydroxy-5'-methylphenyl)-5-chlorobenzotriazole, d. from 0 to 5% by weight based on the weight of a polymer of a phenolic antioxidant selected from n-octadecyl 3',5'-di-t-butyl-4'-hydroxyphenyl) propionate, tetrakis-{methylene 3-(3',5'-di-t-butyl-4'-hydroxyphenyl)propionate}methane, di-n-octadecyl 3,5-di-t-butyl-4-hydroxybenzylphosphonate, tris(3,5-di-t-butyl-4-hydroxybenzyl)isocyanurate, di-octadecyl-2-(3-t-bitu;-5-methyl-4-hydroxybenzyl)malonate, and 1,3,5-tris-(3,5-di-t-butyl-4-hydroxybenzyl)5-triazine-2,4,6-(IH,3H)-trione, e. from 0 to 5% by weight based on the weight of polymer of an organosulfur compound selected from dilaurylthiodiprionate and distearylthiodynapionate, provided that said composition is synergistic in its activity.

2. A composition according to claim 1 which comprises
a. polypropylene
b. nickel bis-3,5-di-t-butyl-4-hydroxybenzoate
c. 2-(2'-hydroxy-3',5'-di-t-amylphenyl)benzotriazole.

3. A composition according to claim 1 which comprises
a. polypropylene
b. nickel bis-3,5-di-t-butyl-4-hydroxybenzoate
c. 2-(2'-hydroxy-3',5'-di-t-butylphenyl)-5-chlorobenzotriazole.

4. A composition according to claim 1 which comprises
a. polypropylene
b. nickel bis-3,5-di-t-butyl-4-hydroxybenzoate
c. 2-hydroxy-4-n-octoxybenzophenone.

5. A composition according to claim 1 which comprises
a. polypropylene
b. nickel bis-3,5-di-t-butyl-4-hydroxybenzoate
c. 2-(3'-t-butyl-2'-hydroxy-5'-methylphenyl)-5-chlorobenzotriazole.

6. A composition according to claim 1 which comprises
a. polypropylene
b. nickel bis-3,5-di-t-butyl-4-hydroxybenzoate
c. 2-(2'-hydroxy-3',5'-di-t-amylphenyl)benzotriazole
d. n-octadecyl 3(3',5'-di-t-butyl-4'-hydroxyphenyl)propionate.

7. A composition according to claim 1 which comprises
a. polypropylene
b. nickel bis-3,5-di-t-butyl-4-hydroxybenzoate
c. 2-(2'-hydroxy-3',5'-di-t-butylphenyl)benzotriazole
d. n-octadecyl 3(3',5'-di-t-butyl-4-hydroxyphenyl)propionate.

8. A composition according to claim 1 which comprises
a. polypropylene
b. nickel bis-3,5-di-t-butyl-4-hydroxybenzoate
c. 2-hydroxy-4-n-octoxybenzophenone
d. n-octadecyl 3(3',5'-di-t-butyl-4'-hydroxyphenyl)propionate.

9. A composition according to claim 1 which comprises
a. polypropylene
b. nickel bis-3,5-di-t-butyl-4-hydroxybenzoate
c. 2-(5'-t-butyl-2'-hydroxy-5'-methylphenyl)-5-chlorobenzotriazole
d. n-octadecyl 3(3',5'-di-t-butyl-4'-hydroxyphenyl)propionate.

10. A composition according to claim 1 which comprises
a. polypropylene
b. nickel bis-3,5-di-t-butyl-4-hydroxybenzoate
c. 2-(2'-hydroxy-3',5'-di-t-amylphenyl)benzotriazole
d. tetrakis {methylene-3-(3',5'-di-t-butyl-4'-hydroxyphenyl)propionate}methane.

11. A composition according to claim 1 which comprises
a. polypropylene
b. nickel bis-3,5-di-t-butyl-4-hydroxybenzoate
c. 2-(2'-hydroxy-3',5'-di-t-amylphenyl)benzotriazole
d. di-n-octadecyl-3,5-di-t-butyl-4-hydroxybenzylphosphonate.

12. A composition according to claim 1 which comprises
a. polypropylene
b. nickel bis-3,5-di-t-butyl-4-hydroxybenzoate
c. 2-(2'-hydroxy-3',5'-di-t-amylphenyl)benzotriazole
d. 1,3,5-tris-(3,5-di-t-butyl-4-hydroxybenzyl)-5-triazine-2,4,6-(1H, 3H, 5H)-trione.

13. A composition according to claim 1 which comprises
a. polypropylene
b. nickel bis-3,5-di-t-butyl-4-hydroxybenzoate
c. 2-(2'-hydroxy-3',5'-di-t-amylphenyl)benzotriazole
d. di-n-octadecyl-2-(3-t-butyl-4-methyl-4-hydroxybenzyl)malonate.

14. A composition according to claim 1 which comprises
a. polypropylene
b. nickel bis-3,5-di-t-butyl-4-hydroxybenzoate
c. 2-(2'-hydroxy-3',5'-di-t-amylphenyl)benzotriazole
d. n-octadecyl 3(3',5'-di-t-butyl-4'-hydroxyphenyl)propionate
e. distearylthiodipropionate.

* * * * *